(12) United States Patent
Halbei et al.

(10) Patent No.: US 7,975,472 B2
(45) Date of Patent: Jul. 12, 2011

(54) EXHAUST GAS SYSTEM FOR AN INTERNAL COMBUSTION ENGINE

(75) Inventors: Julia Halbei, Korb (DE); Josef Rudelt, Aichwald (DE); Felix Neumann, Esslingen (DE); Sabine Meiser, Waiblingen (DE); Matthias Horn, Freiberg (DE); Thomas Christian Hofmann, Ludwigsburg (DE)

(73) Assignees: J. Eberspaecher GmbH & Co. KG, Esslingen (DE); Robert Bosch GmbH, Stuttgart (DE)

( * ) Notice: Subject to any disclaimer, the term of this patent is extended or adjusted under 35 U.S.C. 154(b) by 985 days.

(21) Appl. No.: 11/847,491

(22) Filed: Aug. 30, 2007

(65) Prior Publication Data
US 2008/0066448 A1 Mar. 20, 2008

(30) Foreign Application Priority Data
Sep. 11, 2006 (DE) .......... 10 2006 043 225

(51) Int. Cl.
*F01N 1/00* (2006.01)
(52) U.S. Cl. .......... 60/324; 60/289; 60/286; 60/282; 60/274
(58) Field of Classification Search .......... 60/273, 60/274, 284–287, 299–301, 324
See application file for complete search history.

(56) References Cited

U.S. PATENT DOCUMENTS

| | | | | |
|---|---|---|---|---|
| 4,538,413 A | * | 9/1985 | Shinzawa et al. | 60/303 |
| 5,272,871 A | * | 12/1993 | Oshima et al. | 60/274 |
| 5,431,893 A | * | 7/1995 | Hug et al. | 423/239.1 |
| 6,065,961 A | * | 5/2000 | Shaffer et al. | 431/328 |
| 6,722,123 B2 | * | 4/2004 | Liu et al. | 60/286 |
| 6,722,124 B2 | * | 4/2004 | Pawson et al. | 60/286 |
| 7,328,572 B2 | * | 2/2008 | McKinley et al. | 60/286 |
| 7,448,206 B2 | * | 11/2008 | Meingast et al. | 60/286 |
| 7,748,212 B2 | * | 7/2010 | Sedlacek et al. | 60/286 |
| 7,793,494 B2 | * | 9/2010 | Wirth et al. | 60/324 |
| 7,882,696 B2 | * | 2/2011 | Anderson et al. | 60/262 |
| 2002/0162322 A1 | * | 11/2002 | Ganzmann et al. | 60/286 |
| 2003/0070424 A1 | | 4/2003 | Verdegan et al. | |
| 2004/0005250 A1 | * | 1/2004 | Fischer et al. | 422/180 |
| 2007/0036694 A1 | * | 2/2007 | Nishioka et al. | 422/168 |

FOREIGN PATENT DOCUMENTS

| | | |
|---|---|---|
| DE | 102004020138 A1 | 11/2005 |
| WO | WO2005073524 A1 | 8/2005 |
| WO | WO2006014129 A1 | 2/2006 |

\* cited by examiner

*Primary Examiner* — Thomas E Denion
*Assistant Examiner* — Jesse Bogue
(74) *Attorney, Agent, or Firm* — Thomas E. Hill; Wildman, Harrold, Allen & Dixon LLP

(57) ABSTRACT

The present invention relates to an exhaust system (1) for an internal combustion engine (3) having at least one exhaust gas line (2) that carries exhaust gas and having an injection device (4) for spraying a liquid into the exhaust gas line (2). Downstream from the injection device (4) a vaporizer device (7) which has at least one tubular sheet metal body (8) downstream from the injection device (4), said sheet metal body extending in the longitudinal direction of the exhaust gas line (2) and causing an improved vaporization of the liquid sprayed into the exhaust gas line. In addition, at least one clamp device (12) which is designed like a spring is provided, securing the vaporizer device (7) in the exhaust gas line (2) and/or bracing it elastically against the exhaust gas line.

13 Claims, 2 Drawing Sheets

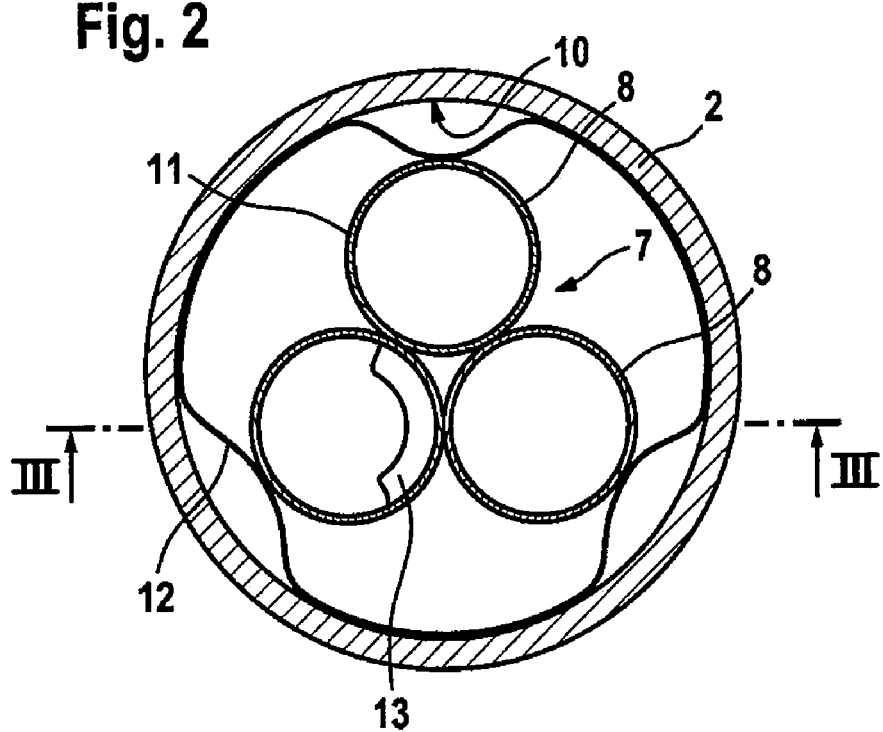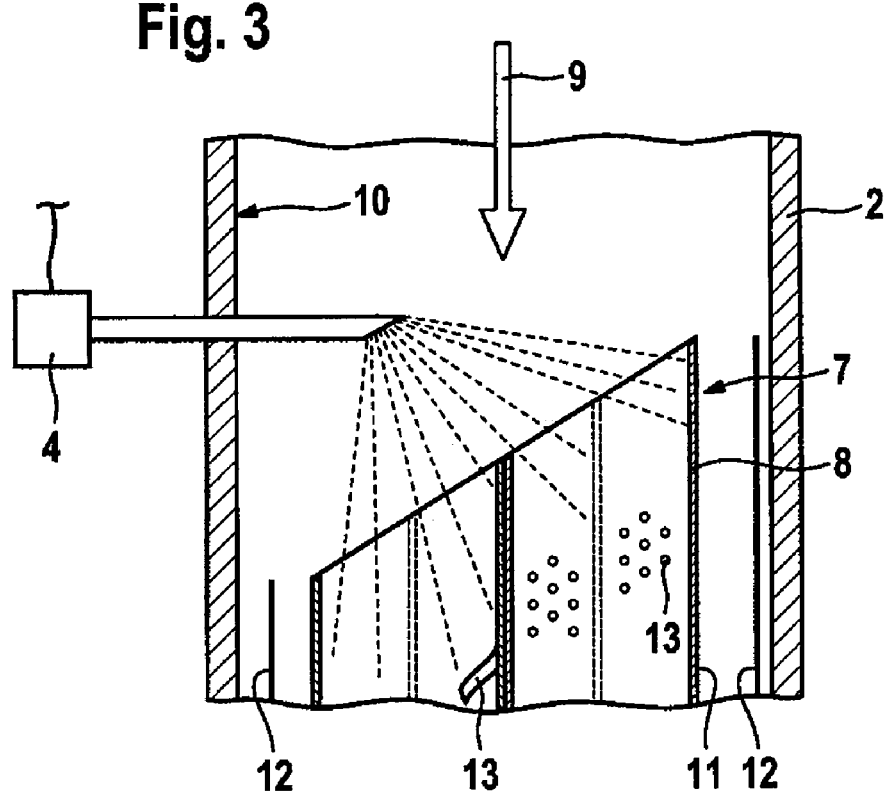

EXHAUST GAS SYSTEM FOR AN INTERNAL COMBUSTION ENGINE

The present, invention relates to an exhaust gas system for an internal combustion engine, in particular in a motor vehicle.

An exhaust gas system of an internal combustion engine usually has at least one exhaust gas line which removes the exhaust gases generated during operation of the internal combustion engine and emits them into the environment of the internal combustion engine and/or the environment of the motor vehicle equipped with the internal combustion engine. In addition, devices for exhaust gas purification, e.g., an SCR catalytic converter for catalytic reduction are also provided in modern exhaust gas systems. With such an exhaust gas device, the nitrogen oxides of the exhaust are converted with the help of a reducing agent previously injected into the exhaust gas line via an injection device, thereby reducing emissions of nitrogen oxide ($NO_x$). For example, urea may be used as the reducing agent. The reducing agent evaporates due to the heat in the exhaust gas stream and decomposes to form an ammonia precursor which reacts with the nitrogen oxides in the SCR catalytic converter to form nitrogen and water. The better the reaction of the injected reducing agent in the vapor or gas, the more successful will be the chemical reaction taking place in the SCR catalytic converter.

The present invention relates to the problem of providing an improved embodiment of an exhaust gas system of the type defined in the introduction such that it will be characterized in particular by a simple installation and especially good vaporization of the injected liquid.

This problem is achieved according to this invention by the subject of the independent claim 1. Advantageous embodiments are the subject of the dependent claims.

This invention is based on the general idea of arranging a vaporizer device having at least one sheet metal body designed in the form of a tube in the exhaust gas line downstream from the injection device, said sheet metal body being sprayed with a reducing agent in a targeted manner so it is exposed to exhaust gas on its inside and outside, thereby allowing especially rapid vaporization of the reducing agent. The vaporizer device extends in the longitudinal direction of the exhaust gas line so that it causes little or no increase in flow resistance in the exhaust gas line. Furthermore, the present invention also makes use of the finding that the liquid sprayed into the exhaust stream is mostly deposited on the vaporizer device and does not reach a cold inside wall of the exhaust gas line, so the liquid can evaporate rapidly on the one hand while on the other hand deposits can be prevented by liquid striking the cold inside wall of the exhaust gas line. If the vaporizer device is secured by at least one clamp mechanism whereby the clamp mechanism is stretched like a spring between an inside wall of the exhaust gas line and the vaporizer device, so that the vaporizer device is held elastically in the exhaust gas line by the clamp mechanism. Such a means of securing the vaporizer device via the inventive clamp mechanism facilitates installation of the exhaust system and also has a particularly favorable effect on possible thermal expansion which can be absorbed better by the elastic clamp mechanism. The clamp mechanism may be connected on the one hand to the vaporizer device and/or on the other hand to the exhaust gas line, in particular by welding.

As a result of the improved vaporization of the reducing agent, the desired chemical reaction in the SCR catalytic converter can take place with increased efficiency, so a higher $NO_x$ conversion rate and thus lower $NO_x$ emissions can be achieved.

In an advantageous embodiment of the inventive approach, the vaporizer device has a package of essentially parallel sheet metal bodies, especially three sheet metal bodies. Three of these tubular sheet metal bodies which are in close contact with one another offer the advantage of creating a large internal and external surface area, making it possible to provide a large vaporizer surface and also three tubular sheet metal bodies offer the possibility of being arranged in a space-saving manner in the exhaust gas line.

In another advantageous embodiment, the injection device and the vaporizer device are coordinated with one another so that the injection device sprays the liquid at least partially onto an inside or an outside of the at least one sheet metal body of the vaporizer device. This achieves in a targeted manner vaporization of the sprayed liquid on the inside and/or outside of the at least one sheet metal body, which has a higher temperature due to its exposed position in comparison with an inside wall of the exhaust gas line and therefore yields a better vaporization effect.

A wall of the at least one sheet metal body expediently perforation openings and/or baffles. Both perforation openings and baffles cause turbulence and development of eddies which support the vaporizing effect on the one hand and on the other hand also produce an especially homogeneous mixing of the vaporized reducing agent with the exhaust gas. There follows from this a high conversion rate of nitrogen oxides in the downstream SCR catalytic converter so the $NO_x$ emissions can be reduced.

In one embodiment, vaporizer device is preferably arranged at a distance from the inside wall of the exhaust gas line between its longitudinal ends extending in the longitudinal direction of the exhaust gas line. This ensures that the vaporizer device will have exhaust gas flowing around it on both sides, which leads to an intense heat transfer between the exhaust gas and the vaporizer device so that heat is supplied to it without interruption. The uninterrupted supply of heat results in improved vaporization of the liquid sprayed into the exhaust gas and rapidly compensates for the loss of energy that occurs during vaporization. Vaporization is thus supported.

Additional important features and advantages of the present invention are derived from the subclaims, the drawings and the respective description of the figures on the basis of the drawings.

It is self-evident that the features mentioned above and those yet to be explained below may be used not only in the particular combination given but also in other combinations or alone without going beyond the scope of the present invention.

Preferred exemplary embodiments of the present invention are depicted in the drawings and explained in greater detail in the following description where the same reference numerals are used to refer to the same or functionally identical components.

They show, each in schematic diagrams,

BRIEF DESCRIPTION OF DRAWINGS

FIG. 2 a cross section through the exhaust system in the area of a vaporizer device, FIG. 3 a longitudinal section through the exhaust system in the area of the vaporizer device, According to FIG. 1, an exhaust system 1 has at least one exhaust gas line 2 which carries exhaust gas away from an internal combustion engine 3 into the environment. The internal combustion engine 3 is preferably arranged in a motor vehicle. In addition the exhaust system 1 comprises at least one injection device 4 with the help of which a liquid can be injected, i.e., sprayed into the exhaust gas line 2. As shown in FIG. 1, the exhaust gas line 2 is interrupted and is not shown completely because additional components may be tied into the exhaust system 1 such as a catalytic converter or a muffler, between the section connected to the internal combustion engine 3 and the section allocated to the injection device 4 as well as being tied into the exhaust system downstream from the section shown here, which is coupled to the injection device 4.

Figure 1:
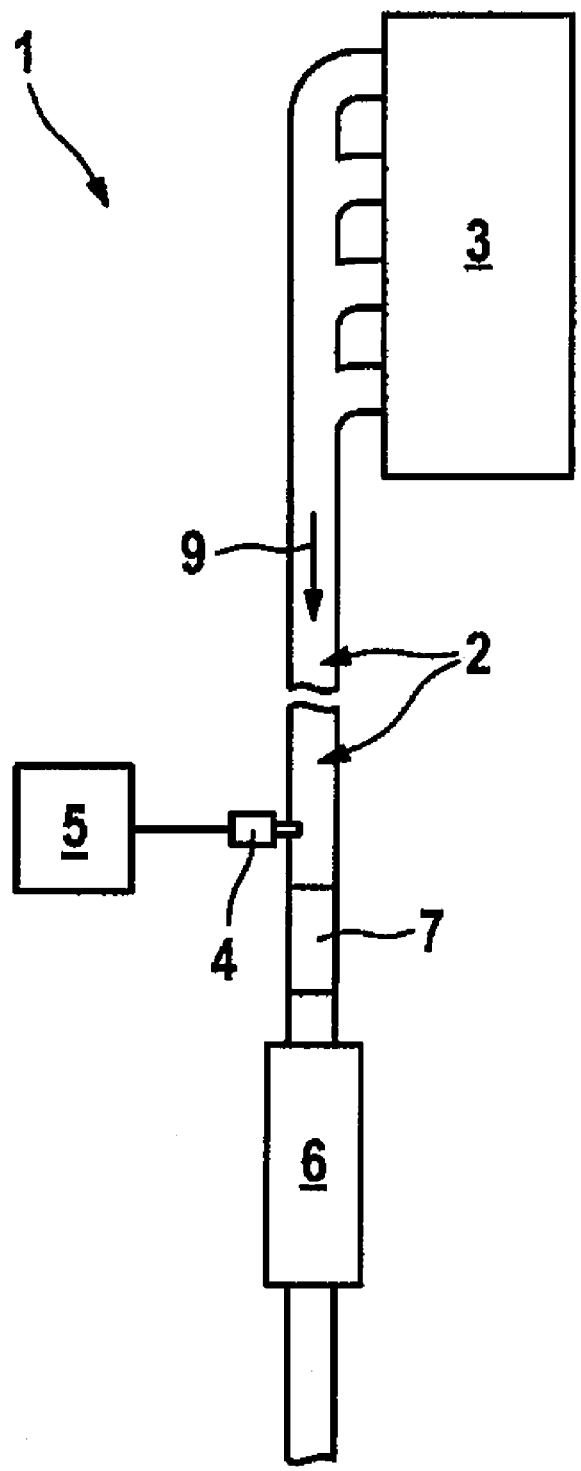
FIG. 1 a greatly simplified schematic diagram of an exhaust system.

On its end facing away from the exhaust gas line 2, the injection device 4 is connected to a metering system 5, for example, which supplies the liquid to the injection device 4 for spray injection. This liquid may be, for example, a liquid reducing agent, such as aqueous solutions of urea or urea-ammonium formate mixtures (e.g., Denoxium™ from the company Kemira in Finland). Downstream from the injection device 4, i.e., downstream from the injection site of the liquid, an SCR catalytic converter 6 is arranged in the exhaust gas line 2; with the help of this catalytic converter, reducing agents sprayed in through the injection device 4 are able to reduce nitrogen oxides entrained in the exhaust and thereby reduce nitrogen oxide emissions ($NO_x$ emissions). The liquid sprayed into the exhaust gas line 2, in particular the reducing agent, vaporizes in the hot gas stream of the exhaust and decomposes to form, among other things, an ammonia precursor, which reacts with nitrogen oxides in the SCR catalytic converter 6 to form nitrogen and water.

In another embodiment, the injection device 4 may of course also be provided for spraying another liquid, in particular a fuel, with which the internal combustion engine 3 is operated. In such an embodiment, an oxidation catalytic converter is then provided downstream from the injection device 4; this catalytic converter can be heated with the help of the injected fuel to shorten the cold start phase of the internal combustion engine 3.

According to the present invention, a vaporizer device 7 having at least one sheet metal body 8 designed in the form of a tube extending in the longitudinal direction of the exhaust gas line 2 is arranged in the exhaust gas line 2 downstream from the injection device 4 and upstream from the SCR catalytic converter 6 where it is exposed to the exhaust gas flow carried in the exhaust gas line 2 on both the inside and outside. The at least one sheet metal body 8 of the vaporizer device 7 functions here as a vaporization aid and improves the degree of vaporization of the injected liquid.

According to FIGS. 2 and 3 the vaporizer device 7 has a total of three tubular sheet metals bodies 8 which extend in the longitudinal direction of the exhaust gas line 2. The direction of flow of the exhaust gas flowing in the exhaust gas line 2 during operation of the internal combustion engine 3 is represented by an arrow and is labeled as 9 (see FIG. 3).

All the walls 11 of the sheet metal bodies 8 are exposed on both the inside and outside to the exhaust gas flow passing through the exhaust gas line 2 and therefore heat up relatively rapidly. In particular, the heating takes place much more rapidly than the heating of an inside wall 10 of the exhaust gas line 2. Due to the more rapid heating of the walls 11 of the sheet metal body 8, the walls also act as a vaporization aid during the cold start phase if a liquid, in particular a reducing agent, is brought in contact with the walls 11 and/or sprayed onto them through the injection device 4.

In general, the vaporizer devices 7 according to FIGS. 2 and 3 each have a total of three sheet metal bodies 8, whereby a larger or smaller package of sheet metal bodies 8 arranged essentially in parallel should also be covered by the present invention.

The vaporizer device 7 and/or the sheet metal bodies 8 belonging with it are secured in the exhaust gas line 2 via at least one clamp mechanism 12 designed to be elastic, bracing the vaporizer device 7 resiliently against the inside wall 10 of the exhaust gas line 2. The clamp mechanism 12 greatly facilitates installation of the vaporizer device 7 in the exhaust gas line 2 because welding of the vaporizer device 7 to the exhaust gas line 2, which was previously necessary, can be omitted. At the same time, the clamp mechanism 12 is capable of elastically absorbing thermal stresses that may occur due to the different operating temperatures in the exhaust gas line 2 so that critical stress peaks in particular can be relieved. In comparison with a vaporizer device 7 connected to the exhaust gas line 2 via a welded joint, critical compulsory states can be prevented by the elastic clamp mechanism 12. The clamp mechanism 12 may be made of a heat-resistant material, e.g., steel plate or spring steel.

To be able to achieve the highest possible $NO_x$ conversion rate in the SCR catalytic converter 6, it is important that the processing of the reducing agent to yield the catalytic converter will have proceeded to the extent that it is completely vaporized and is homogeneously distributed in the exhaust gas. Depending on the quality of the spray and the operating conditions, however, relatively long vaporization and decomposition distances may be required to do so. To shorten these distances substantially, the inventive vaporizer device 7 is arranged downstream from the injection device 4. The individual sheet metal bodies 8 of the vaporizer device 7 provide a large impact and vaporization surface for the liquid reducing agent sprayed in through the injection device 4, so that the reducing agent evaporates over a relatively short distance but at the latest by the point of entry into the SCR catalytic converter 6. Due to the flow around the vaporizer device 7 on both the inside and outside, it heats up much more rapidly than the inside wall 10 of the exhaust gas line 2, as mentioned above, so that even in the cold start phase of the internal combustion engine 3, a satisfactory vaporization of the reducing agent can be achieved. In particular, deposits such as those that would occur if the reducing agent were sprayed onto the cold inside wall 10 of the exhaust gas line 2, are prevented by the vaporizer device 7 according to the present invention.

According to FIG. 3, the injection device 4 and the vaporizing device 7 are coordinated so that the injection device 4 sprays the liquid, e.g., the reducing agent at least partially onto the inside and/or outside of the at least one sheet metal body 8. To be able to achieve the best possible feed of fluid into and/or application of fluid to the vaporizer device 7, the sheet metal bodies 8 are superficially cut obliquely on the end facing the injection device 4. It is also conceivable for them to have other cutouts which produce an improved injection and/or improved application of the liquid reducing agent into and/or onto the sheet metal bodies 8.

To be able to achieve adequate homogeneity of the exhaust gas mixture in addition to adequate vaporization, at least one perforation opening may be provided in at least one wall 11 of the sheet metal body 8 or baffles 13, e.g., straps or vanes may be provided on at least one sheet metal body 8, producing additional turbulence and/or eddies and thereby a good mixing effect of the exhaust gas mixture.

In general, the vaporizer device 7 is arranged at a distance from the inside wall 10 of the exhaust gas line 2 between the longitudinal ends extending in the longitudinal direction of the exhaust gas line 2. This ensures that exhaust gas will flow around the walls 11 of the sheet metal body 8 on both sides, thus achieving an intense transfer of heat between the exhaust gas and the sheet metal bodies 8. This a great advantage in particular because the vaporization process can thus be maintained continuously and the vaporization heat released in vaporization of the liquid sprayed in can be compensated rapidly.

According to FIG. 3, the end of the sheet metal bodies 8 of the vaporizer device 7 situated upstream is designed as an oncoming flow edge which facilitates the flow of gas around the respective walls 11 of the sheet metal bodies 8 and thereby reduces the flow resistance. In a corresponding manner, a downstream end (not visible here) of the respective sheet metal bodies 8 may also be designed as an outgoing flow edge which thereby also reduces the flow resistance.

As shown in FIGS. 2 and 3, the vaporizer device 7 is arranged essentially centrally in the exhaust gas line 2 and is aligned so that it is axially parallel and/or coaxial with the exhaust gas line 2. The axially parallel and/or coaxial arrangement of the vaporizer device 7 in the exhaust gas line 2 additionally reduces the flow resistance. The central arrangement of the vaporizer device 7 in the exhaust gas line 2 is also to be considered merely as one possible embodiment so that a deaxialized and/or decentralized arrangement of the vaporizer device 7 in the exhaust gas line 2 should also be covered by the present invention if this would have a positive effect on the vaporizer capacity and/or the flow resistance.

The invention claimed is:

1. An exhaust gas system (1) for an internal combustion engine (3), for use in in a motor vehicle,
    with at least one exhaust gas line (2) carrying exhaust gas,
    with an injection device (4) for injecting a liquid into the exhaust gas line (2),
    wherein downstream from the injection device (4) a vaporizer device (7) with or made of at least one sheet metal body (8) designed in the form of a tube is arranged in the exhaust gas line (2), extending in the longitudinal direction of the exhaust gas line (2) and being exposed on both the inside and outside to an exhaust gas flow conveyed in the exhaust gas line (2),
    wherein at least one clamp mechanism (12) designed like a spring is provided, securing the vaporizer device (7) in the exhaust gas line (2),
    wherein the vaporizer device (7) is arranged at a distance from an inside wall (10) of the exhaust gas line (2) between the longitudinal ends extending in the longitudinal direction of the exhaust gas line (2), and
    wherein the at least one clamp mechanism (12) braces the vaporizer device (7) with respect to the inside wall (10) of the exhaust gas line (2) with spring elasticity.

2. The exhaust system according to claim 1, wherein the vaporizer device (7) has a group of essentially parallel sheet metal bodies (8), comprising three tubular sheet metal bodies.

3. The exhaust system according to claim 1, wherein the injection device (4) and the vaporizer device (7) are coordinated with one another so that the injection device (4) sprays the liquid at least partially onto the inside or the outside of the at least one sheet metal body (8).

4. The exhaust system according to claim 1, wherein at least one sheet metal body (8) is superficially cut obliquely on at least one longitudinal end extending in the longitudinal direction of the exhaust gas line (2) or has a cutout there.

5. The exhaust system according to claim 1, wherein a wall (11) of the at least one sheet metal body (8) has perforation openings and/or baffle elements (13).

6. The exhaust system according to claim 1, wherein an upstream end of at least one sheet metal body (8) of the vaporizer device (7) is designed as an oncoming flow edge.

7. The exhaust system according to claim 1, wherein a downstream end of at least one sheet metal body (8) of the vaporizer device (7) is designed as an outgoing flow edge.

8. The exhaust system according to claim 1, wherein the at least one clamp mechanism (12) is supported on the vaporizer device (7) at one end and on the inside wall (10) of the exhaust gas line (2) at the other end.

9. The exhaust system according to claim 1, wherein the vaporizer device (7) is arranged essentially centrally in the exhaust gas line (2).

10. The exhaust system according to claim 1, wherein the vaporizer device (7) is arranged coaxially in the exhaust gas line (2).

11. The exhaust system according to claim 1, wherein the vaporizer device (7) is arranged axially parallel in the exhaust gas line (2).

12. The exhaust system according to claim 1, wherein the vaporizer device (7) is arranged coaxially and axially parallel in the exhaust gas line (2).

13. The exhaust system according to claim 1, wherein an SCR catalytic converter (6) is arranged downstream from the vaporizer device (7).

* * * * *